(12) United States Patent
Shibukawa et al.

(10) Patent No.: US 7,701,099 B2
(45) Date of Patent: Apr. 20, 2010

(54) AXIAL-GAP MOTOR/GENERATOR

(75) Inventors: Yuichi Shibukawa, Yokosuka (JP); Yukihiro Nishiyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 573 days.

(21) Appl. No.: 11/508,106

(22) Filed: Aug. 22, 2006

(65) Prior Publication Data
US 2007/0046140 A1  Mar. 1, 2007

(30) Foreign Application Priority Data
Aug. 24, 2005 (JP) .............................. 2005-242633

(51) Int. Cl.
*H02K 11/00* (2006.01)
*H02K 23/66* (2006.01)

(52) U.S. Cl. ....................................... 310/71; 310/68 B
(58) Field of Classification Search ................ 310/268, 310/68 B, 71, 112
See application file for complete search history.

(56) References Cited

U.S. PATENT DOCUMENTS

| | | | | |
|---|---|---|---|---|
| 5,770,900 A | * | 6/1998 | Sato et al. ................. | 310/49.13 |
| 5,982,058 A | * | 11/1999 | Bustamante et al. ...... | 310/49 R |
| 6,617,723 B1 | * | 9/2003 | Shichijyo ..................... | 310/71 |
| 2002/0074868 A1 | * | 6/2002 | Ishida .......................... | 310/54 |
| 2005/0046297 A1 | * | 3/2005 | Chen et al. .................. | 310/180 |

FOREIGN PATENT DOCUMENTS

JP     2003-111346     11/2003

* cited by examiner

*Primary Examiner*—Quyen Leung
*Assistant Examiner*—Leda Pham
(74) *Attorney, Agent, or Firm*—Global IP Counselors, LLP (57) ABSTRACT

An axial-gap motor/generator that has a stator equipped with a plurality of polyphase coils from which are led output lead wires, wherein wire connectors 16 for each of coil 12 are divided and arranged on the front side and rear side of the side surface of stator 10.

20 Claims, 9 Drawing Sheets

THE CURRENT FROM THE FRONT

THE CURRENT FROM THE REAR

AXIAL-GAP MOTOR/GENERATOR

CROSS REFERENCES TO RELATED APPLICATION

This application claims priority under 35 U.S.C. §119 of Japanese Patent Application Serial No. 2005-242633 filed Aug. 24, 2005, the entire contents of which is incorporated herein by reference.

TECHNICAL FIELD

The present invention pertains to an axial-gap motor/generator, particularly to the wire connection structure of an axial-gap motor/generator comprising a stator consisting of a polyphase coil.

BACKGROUND

Conventional technology for an axial-gap motor/generator comprising a stator with a polyphase coil consisting of 6 phases, for example, is known. Such an axial-gap motor/generator has one group of 3 output lead wires X1, Y1 and Z1 that lead from the wire connection structure for the three-phase coil on one side and another group of 3 output lead wires U1, V1 and W1 that lead from the three-phase coil on the other side, and the output lead wires from these two groups are led from only one side of the stator.

SUMMARY

The purpose of the present invention is to provide an axial-gap motor/generator that disperses the output lead wires on both sides of the stator in order to allow for improvement of the cooling performance.

In order to achieve the aforementioned objective, for the axial-gap motor/generator comprising a stator equipped with a plurality of polyphase coils from which the output lead wires are led, the wire connection portions of each of the aforementioned coils are distributed by dividing them on both sides of the aforementioned stator.

According to the present invention, for the axial-gap motor/generator comprising a stator equipped with a plurality of polyphase coils from which the output lead wires are led, the wire connections for each coil are wired by dividing them on both sides of the stator. Therefore, the heat source does not concentrate on just one side, causing intense heat on that one side and the cooling performance of the motor can be improved.

DETAILED DESCRIPTION

Next is provided an explanation of the most favorable embodiment of the present invention with reference to the drawings.

Figure 1:
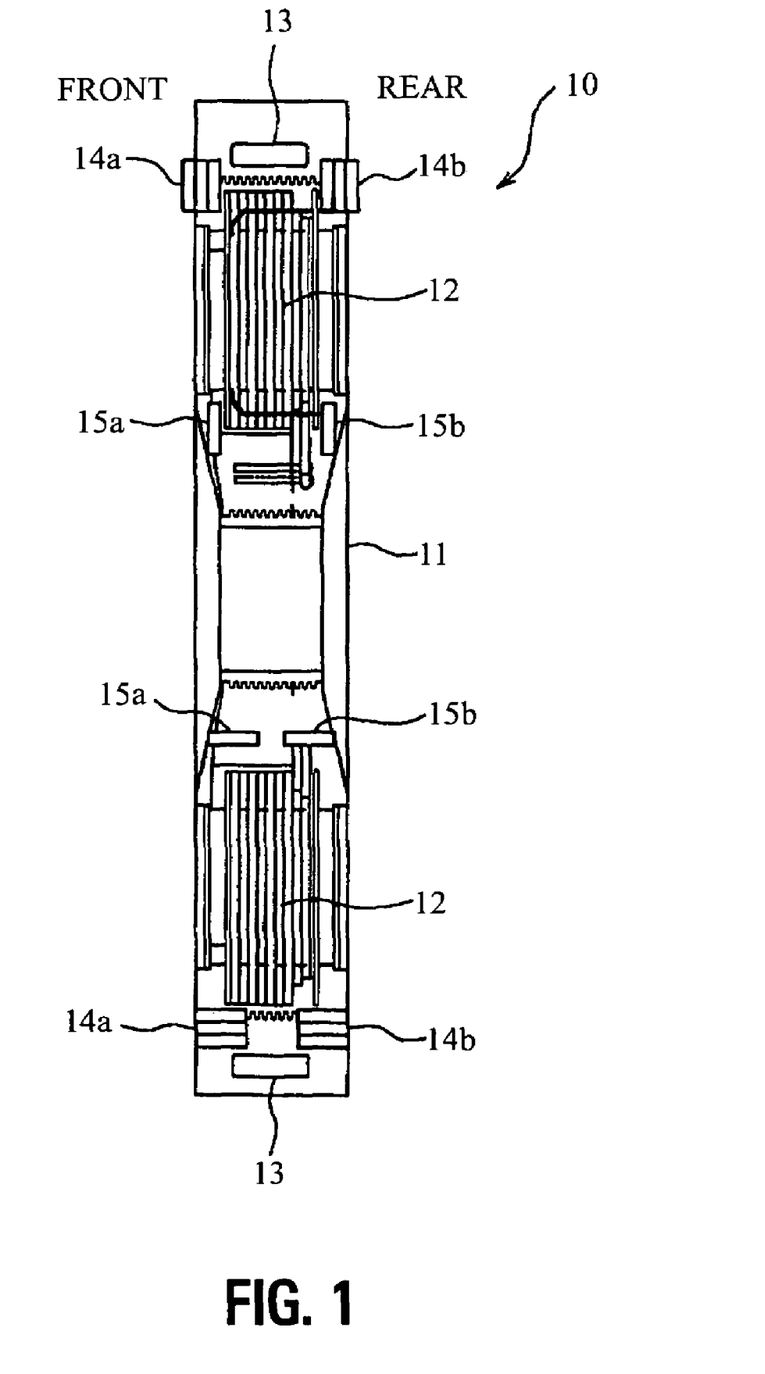
FIG. 1 shows a cross-sectional diagram of the stator for the axial-gap motor/generator pertaining to an embodiment of the present invention.
Figure 2:
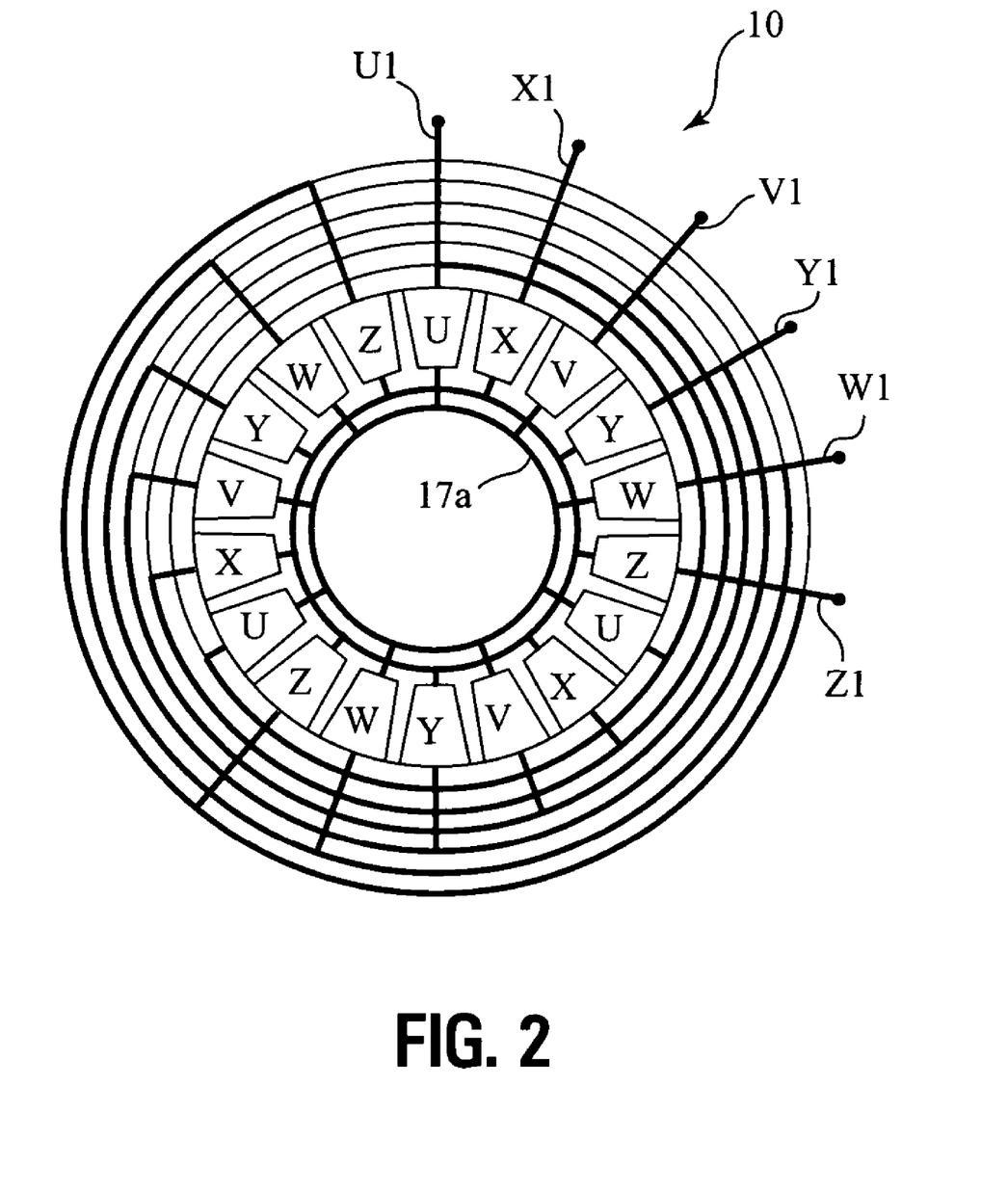
FIG. 2 shows a front view of one embodiment for a wire connection structure for the axial-gap motor/generator of FIG. 1.

FIG. 1 is a diagram showing a cross section of the stator for the axial-gap motor/generator pertaining to an embodiment of the present invention and FIG. 2 is a diagram showing a top view of the wire connection structure for the axial-gap motor/generator shown in FIG. 1.

As shown in FIG. 1 and FIG. 2, the stator 10 of the axial-gap motor/generator comprises stator core 11 formed into a toric shape and positioned around the motor/generator rotation shaft (not shown in the drawing) and coil 12 which consists of a plurality of winding wires arranged in rows along the circumferential direction of stator core 11 (see FIG. 1), wherein coil 12 is equipped with 3 each of U-phase coils, V-phase coils, W-phase coils, X-phase coils, Y-phase coils and Z-phase coils. Therefore, it is made up of 6 phases and 18 slots (see FIG. 2). In addition, arranged inside of the circumferential edge of stator core 11 around the entire circumference is water channel 13 (see FIG. 1).

Three output lead wires X1, Y1 and Z1 that lead from the wire connection structure of one of the three-phase coils make up one group and three output lead wires U1, V1 and W1 that lead from the wire connection structure of the other three-phase coil make up the other group, the wire connections for each phase of the polyphase coils are connected together, and all of the output lead wires included in these two groups are separated onto two different sides of the stator. Therefore, the neutral lead wires that correspond to each of the output lead wires are arranged at intervals for each three-phase coil.

In other words, the end portions of the coils make up one group for each phase that is independently driven, and the coil wire connections for each individual group are divided and arranged at the front side of the stator, which is on one side of the side surface of the stator, and at the rear side of the stator, which is on the other side of the side surface of the stator. Therefore, the bus bar that connects the coil wire connections and the output bus bar arranged on the outer circumference of stator core 11 are also arranged separately as outer circumference laminated bus bar 14a at the front side of the stator and outer circumference laminated bus bar 14b at the rear side of the stator, and the bus bars for the neutral points that are arranged on the inner circumference of stator core 11 are arranged separately as inner circumference laminated bus bar 15a at the front side of the stator and inner circumference laminated bus bar 15b at the rear side of the stator (see FIG. 1).

Figure 3:
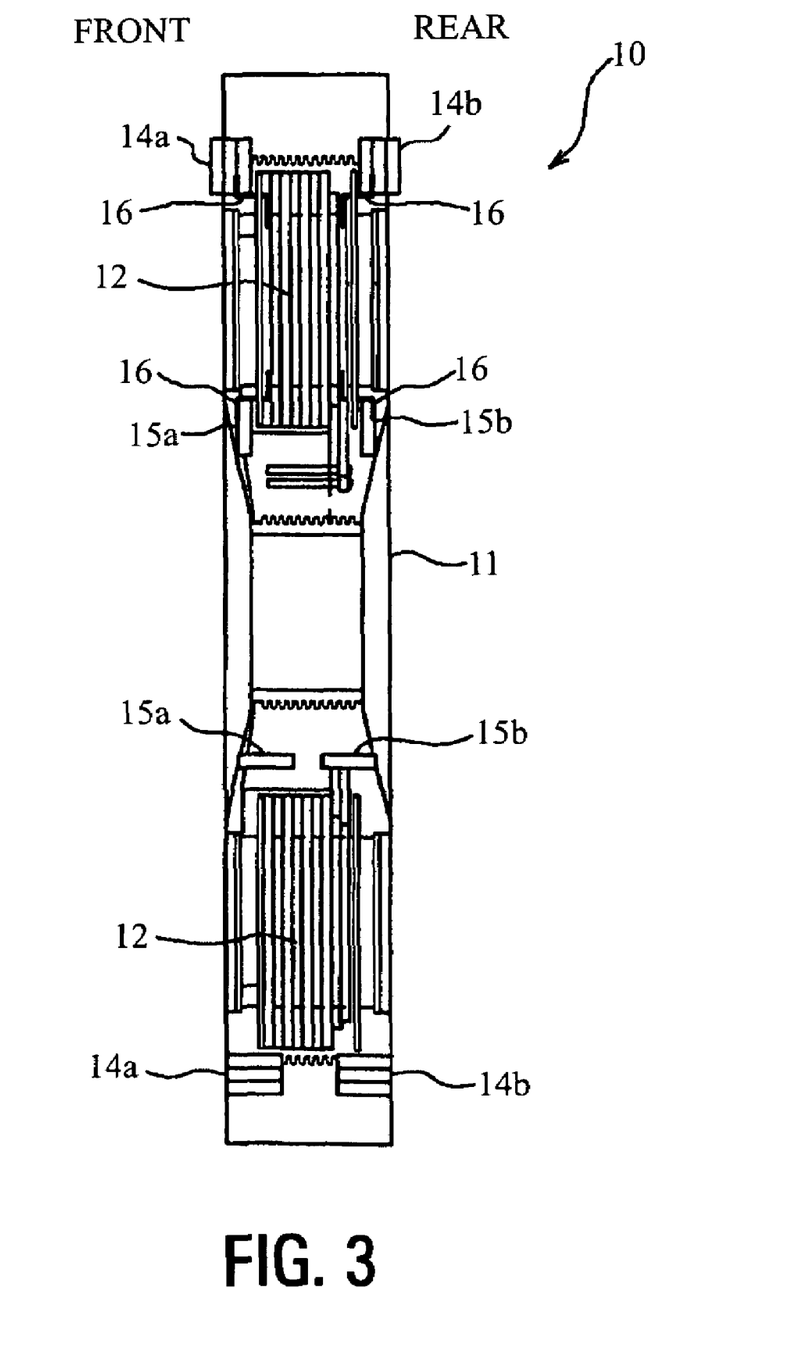
FIG. 3 shows a cross-sectional diagram of the stator of FIG. 1 in which the coil wire connections are arranged in the same direction as the ends of the coils that are to be connected to the coil wire connections.

FIG. 3 is a cross-sectional view of the same stator as that shown in FIG. 1 in which the coil wire connections are arranged in the same direction as the ends of the coils that are to be connected to the coil wire connections. As shown in FIG. 3, coil connections 16, which are divided so as to be arranged at the front side of the stator and at the rear side of the stator, are arranged in the same direction as the ends of the coils that are to be connected to coil connections 16, or in other words, are arranged so that the ends of the coils at the rear side of the stator are positioned on the rear side of the stator (inverted coils).

However, by dividing and installing coil connections 16 in the same direction as each of the ends of coils 12 that are to be connected to coil connections 16, or in other words, by positioning the ends of the coils so that the ends of the coils at the rear side of the stator are arranged at the rear side of the stator, the direction of the current from the front side of the stator and the direction of the current from the rear side of the stator become reversed.

Figure 4:
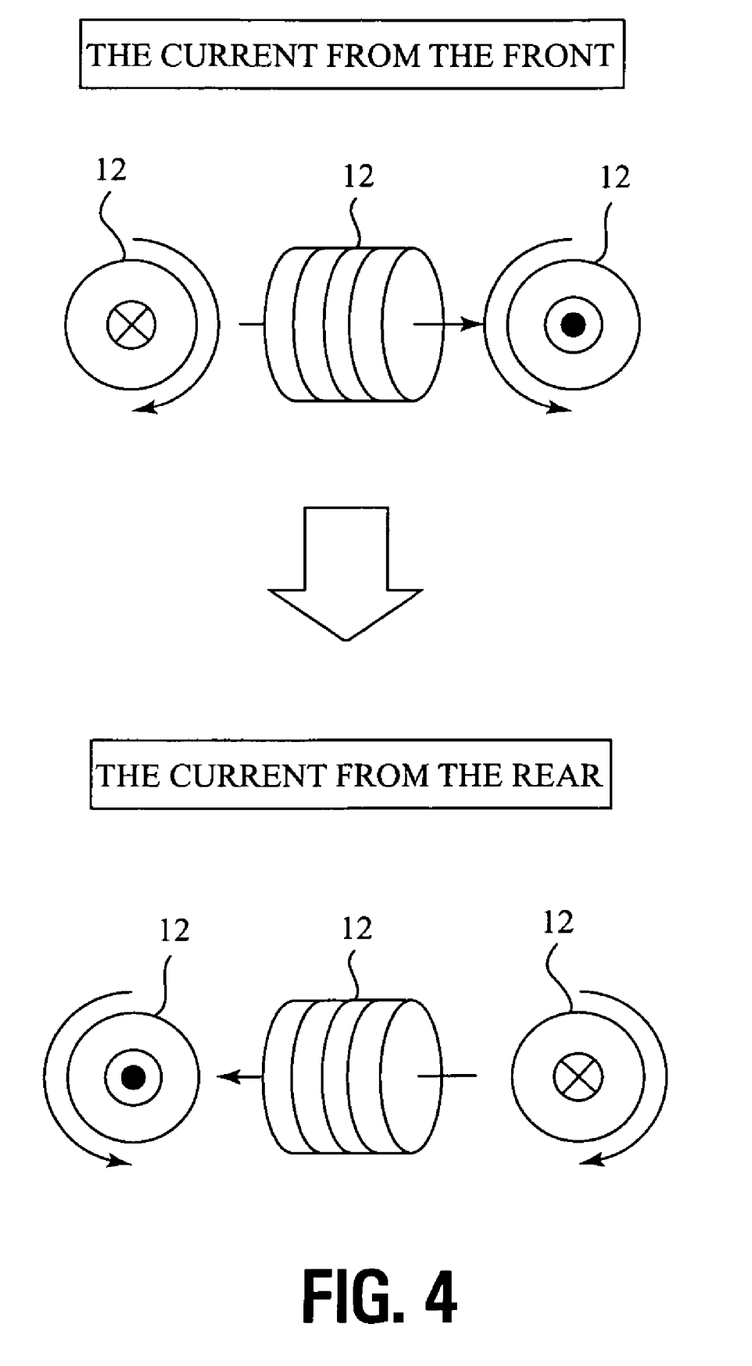
FIG. 4 shows a diagram of the direction of the current for when the ends of the coils at the rear side of the stator are positioned at the rear of the stator.
Figure 5:
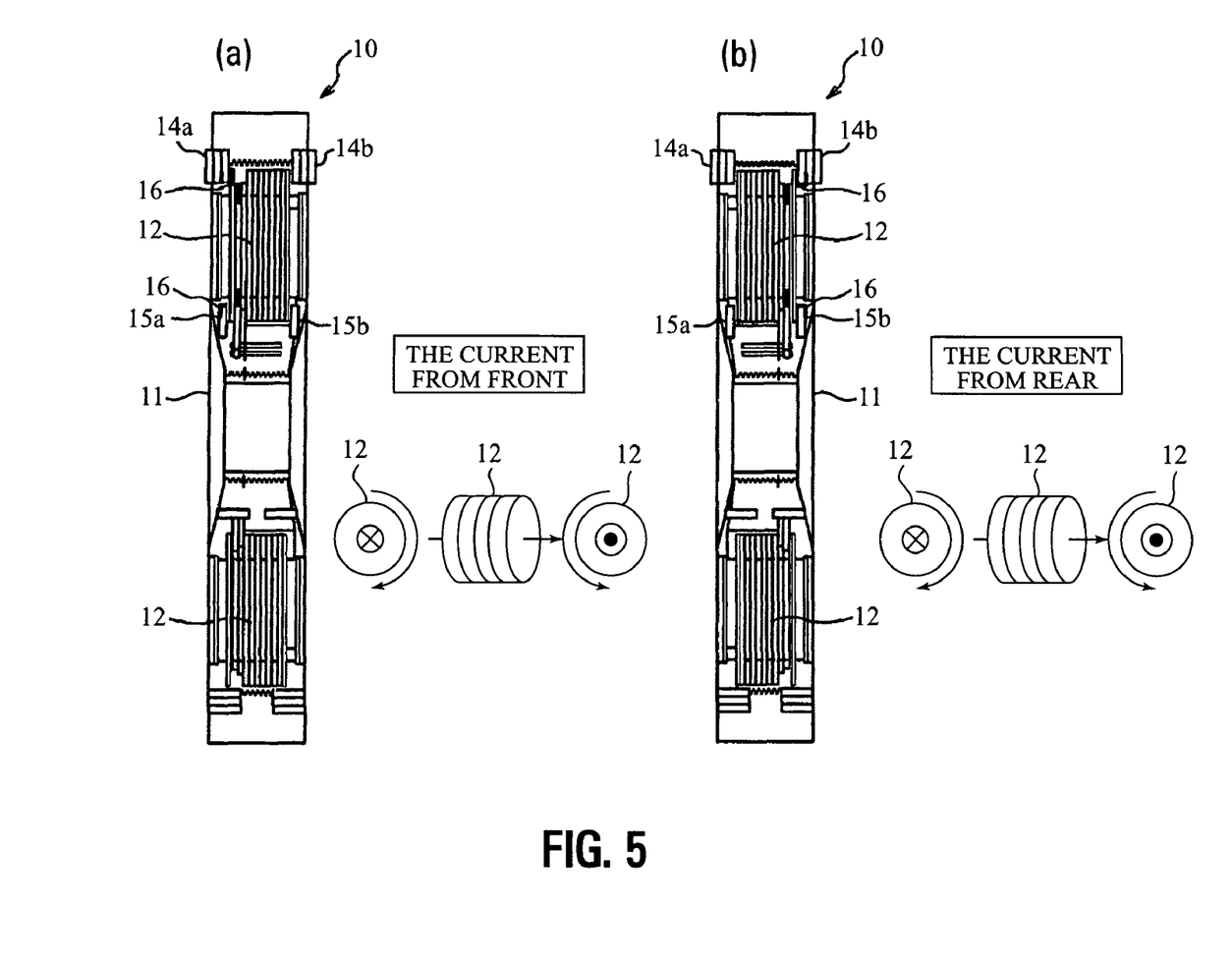
FIG. 5 shows a cross-sectional diagram of the stator of FIG. 1 for when either the front side or rear side of the wire connections for each coil are wound in the reverse directions with (a) showing the front side and (b) showing the rear side.

FIG. 4 is an explanatory diagram showing the direction of the current for when the ends of the coils at the rear side of the stator are positioned at the rear side of the stator. FIG. 5 shows the situation when either the front side or rear side of the wire connections for each of the coils are wound in the reverse directions, with (a) showing a cross section of the front side of the same stator as that shown in FIG. 1 and (b) showing a cross section of the rear side of the same stator as that shown in FIG. 1.

As shown in FIG. 4, the current from the front side of the stator flows from the left side of coil 12 to the right side, as illustrated in this drawing (refer to the X and λ and the arrows), and the current from the rear side of the stator flows from the right side of coil 12 to the left side, as illustrated in this drawing (refer to the X and λ and the arrows). In other words, since the current flows in the reverse direction at the front side of the stator than at the rear side of the stator, it is necessary to change the direction in which coils 12 are wound for the front and rear sides of the stator.

Therefore, as shown in FIG. 5, when the coil wire connection is positioned at the front side of the stator, it is wound in the right direction as viewed from the side on which the input terminal is located (refer to (a)), and when it is positioned at the rear side of the stator, it is wound in the left direction as viewed from the side on which the input terminal is located (refer to (b)). In other words, the direction in which the coil connections are wound is the reverse direction as viewed from the side on which the input terminals are located for each of coils 12.

In this manner, when the coil connections are divided and installed at the front side of one of the sides of the stator and at the rear side of the other one of the sides of the stator, from the standpoint of their neutral point, the coils can be divided into two separate groups with one group consisting of U-phase coils, V-phase coils and W-phase coils and the other group consisting of X-phase coils, Y-phase coils and Z-phase coils.

Figure 6:
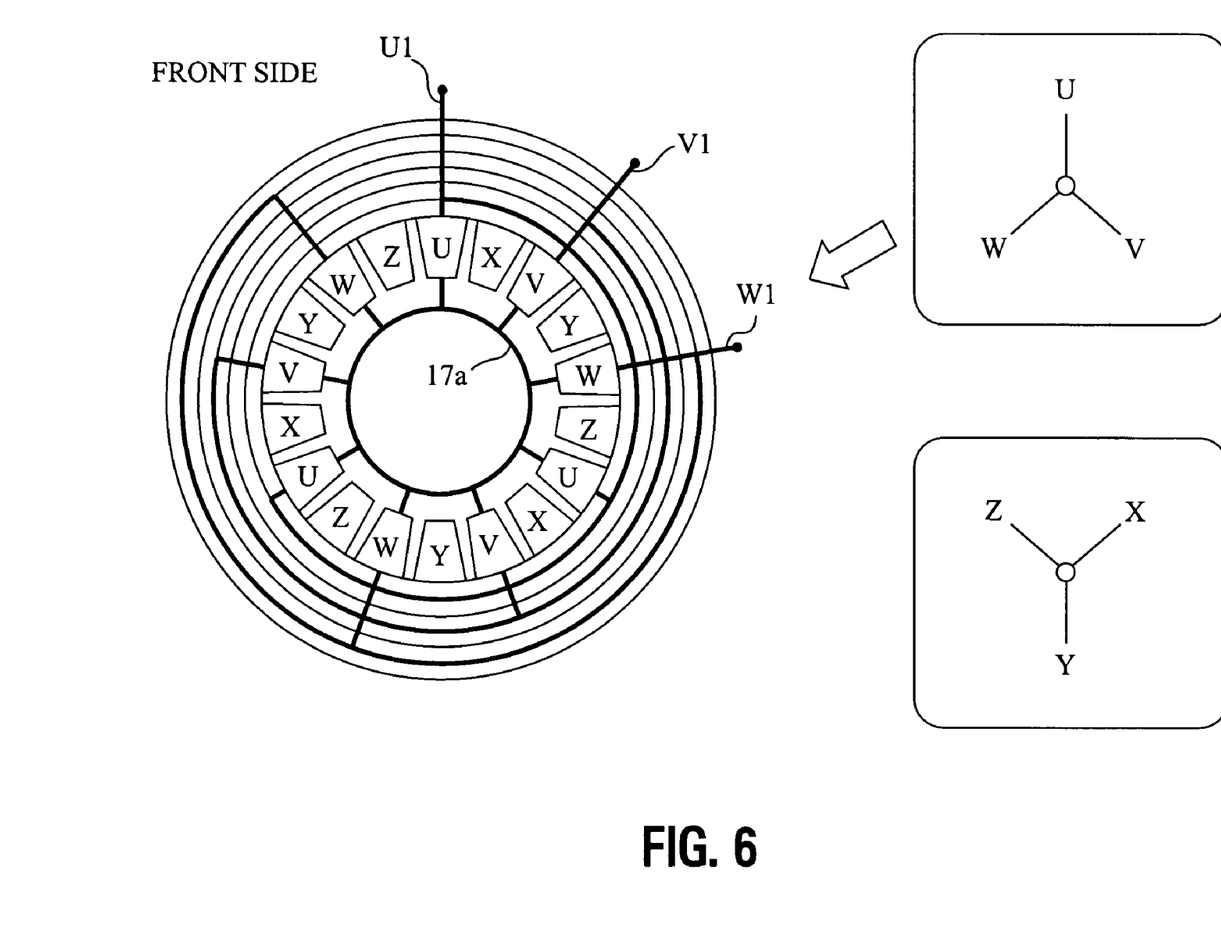
FIG. 6 shows a distribution of the U, V and W phases at their neutral point.
Figure 7:
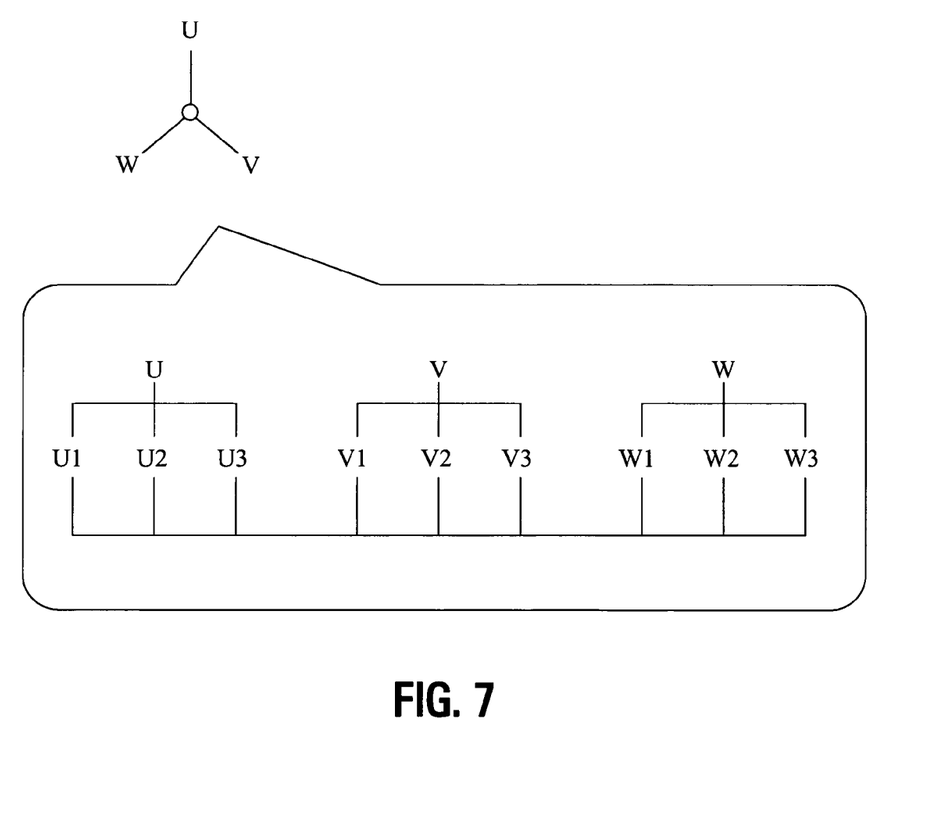
FIG. 7 shows the U, V and W phases when the wires are connected.
Figure 8:
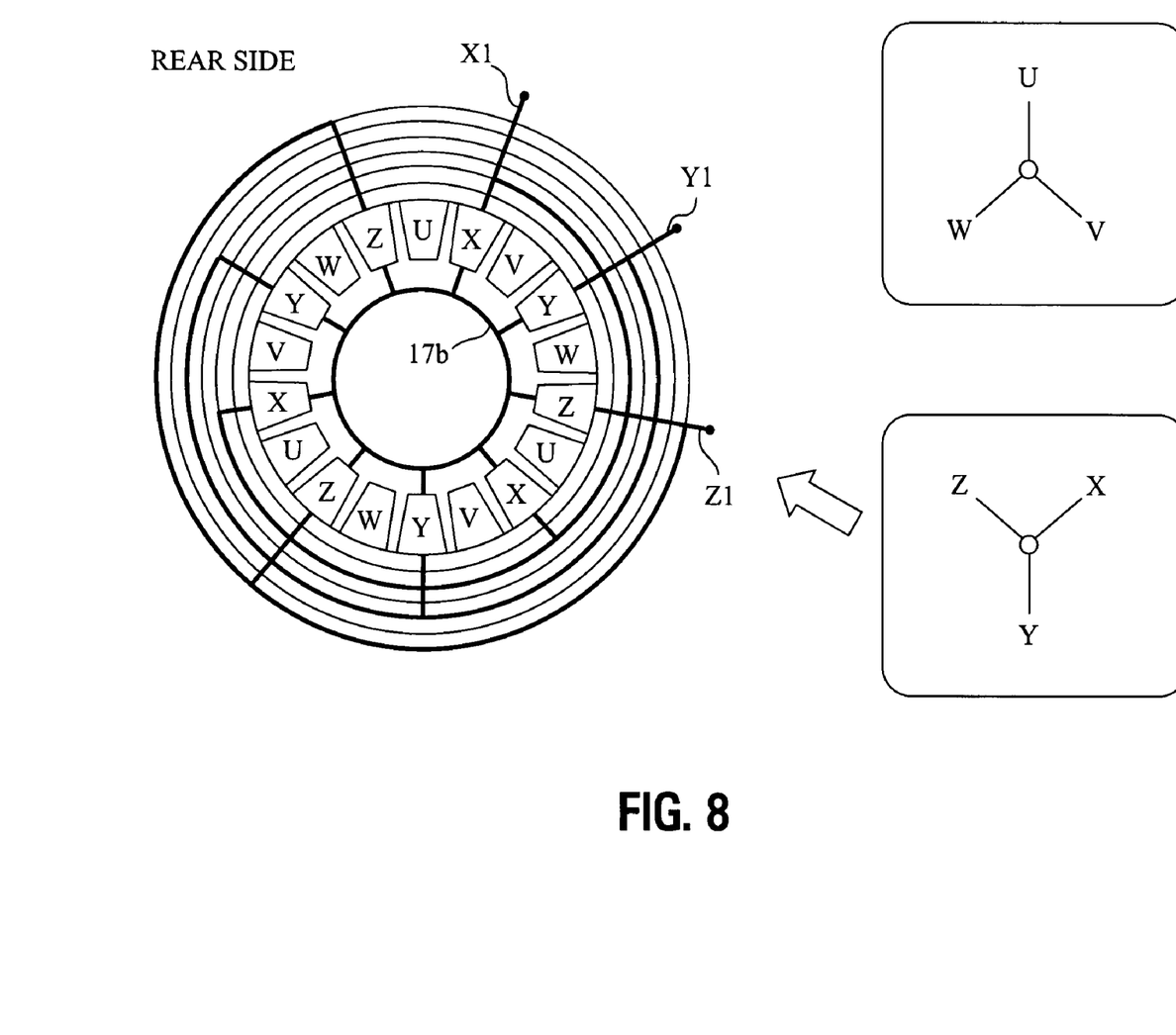
FIG. 8 shows the distribution of the X, Y and Z phases at their neutral point.

FIG. 6 is an explanatory diagram showing the distribution of the U, V and W phase coils at their neutral point. FIG. 7 is an explanatory diagram showing the U, V and W phases when the wires are connected. FIG. 8 is an explanatory diagram showing the distribution of the X, Y and Z phase coils at their neutral point. As shown in FIG. 6, the U-phase coils, V-phase coils and W-phase coils are distributed as one group with their neutral point 17a arranged at the front side of the stator. As shown in FIG. 7, three each of the U-phase coils, V-phase coils and W-phase coils are connected together (U1, U2, U3, V1, V2, V3, W1, W2, W3).

Then, as shown in FIG. 8, the X-phase coils, Y-phase coils and Z-phase coils are distributed as one group with their neutral point 17b arranged at the rear side of the stator. Although not shown in this drawing, as was the case with the other group, three each of the X-phase coils, Y-phase coils and W-phase coils are connected together (X1, X2, X3, Y1, Y2, Y3, Z1, Z2, Z3).

In other words, by grouping phases U, V and W and phases X, Y and Z for coils 12, the line voltage can be changed even further.

Figure 9:
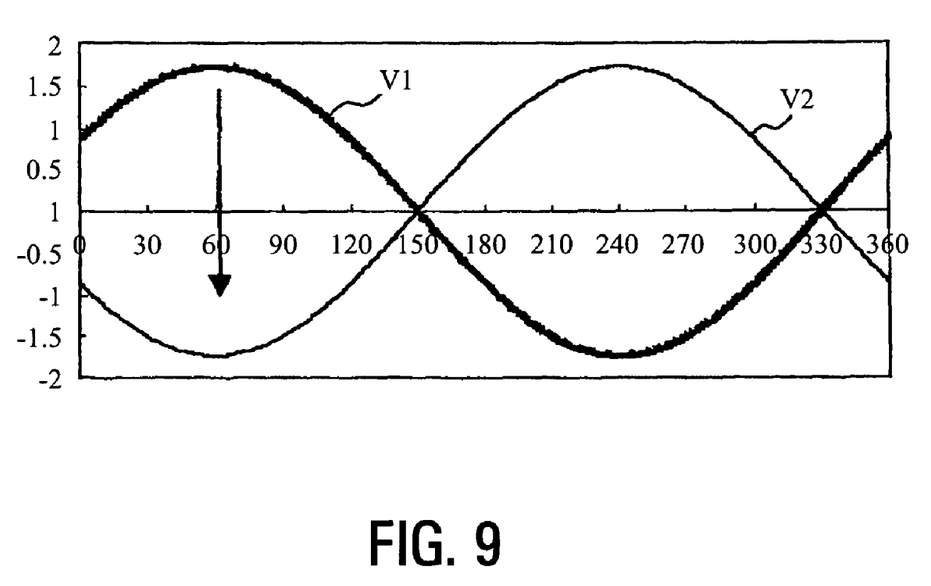
FIG. 9 shows a graph of the situation for when the line voltage phase has been offset for one group of the groups distributed.

FIG. 9 is an explanatory graph showing the situation for when the line voltage phase has been offset for one group of the groups distributed. As shown in FIG. 9, the phase for the line voltage V2 for one of the groups distributed is offset by 180 degrees (π) in relation to the line voltage V1 for the other group distributed. In other words, the coil ends make up one group for each phase that is independently driven and the wire connections for each group unit are distributed at either one side of the stator, or the front side, and the other side of the stator, or the rear side, and then the phase of the line voltage waveform of the group arranged at the rear of the stator, for example, is offset by 180 degrees (π) from the line voltage waveform of the group arranged at the front of the stator in order to change the line voltage. This makes it possible to share coils 12.

As explained above, dividing the bus bars not only made the wiring work more difficult, but it also required additional insulator, so this was handled by changing the direction of the coil ends to coincide with that of the divided wire connections, but changing the direction also changed the direction of the current. Therefore, each phase was grouped and each group unit was divided up and the wires were connected so that the ends of the coil were either on one side of the stator, or the front side or the other side of the stator, or the rear side, and then by changing the direction in which the wires were wound for coils 12 for each group, the direction of the current could be aligned.

Furthermore, by offsetting the phase of the line voltage waveform 180 degrees between the groups arranged at the front side and rear side of the stator, the same coil parts can be used by simply inverting them, regardless of the arrangement of the wire connections at the front side of the stator and at the rear side of the stator. Therefore, a wire connection structure in which cost is curtailed can be achieved, while at the same making the motor more compact and improving the cooling performance.

In this manner, according to the present invention for an axial-gap motor/generator that has a stator equipped with a plurality of polyphase coils from which are led output lead wires, the wire connections for each coil are distributed separately and connected at both sides of the stator, so no additional coil winding process or insulation parts are required, resulting in improved workability for the wiring, a more compact motor and improved cooling performance.

What is claimed is:

1. An axial-gap motor/generator comprising:
    a stator equipped with a plurality of coils;
    a plurality of output lead wires led from the coils; and
    a plurality of coil wire connection portions connecting the plurality of output lead wires, the coil wire connection portions being divided and arranged on both externally and axially facing axial sides of the stator with respect to a rotational axis of the stator.

2. The axial-gap motor/generator of claim 1 wherein the coil wire connection portions are arranged in a substantially similar direction as coil ends of the output lead wires that are connected to the wire connection portions.

3. The axial-gap motor/generator of claim 1 wherein the coils are formed of winding wires with the coils on a first axial side of the stator being wound in an opposite direction from the coils on a second axial side of the stator as viewed from an input terminal side of the coil wire connections of the coils.

4. The axial-gap motor/generator of claim 1 wherein end portions of the coils make up two groups for phases that are independently driven and the coil wire connection portions of each of the groups are arranged on opposite axial sides of the stator.

5. The axial-gap motor/generator of claim 4 wherein a phase of a line voltage waveform for one of the groups on one of the axial sides of the stator is offset by 180 degrees from a phase of a line voltage waveform for the other group of the groups that is on the other of the axial sides.

6. The axial-gap motor/generator of claim 4 wherein each of the groups comprises three different phase coils.

7. An axial-gap motor/generator comprising:
a stator means equipped with a plurality of coils;
a plurality of output lead means that are led from the coils; and
coil wire connection means that connects the output lead means, the coil wire connection means being divided and arranged on both externally and axially facing axial sides of the stator means with respect to a rotational axis of the stator means.

8. The axial-gap motor/generator of claim 7 wherein the coils are grouped into two different groups.

9. The axial-gap motor/generator of claim 8 wherein a first group of the two different groups is arranged on a front axial side of the stator means and a second group of the two different groups is arranged on a rear axial side of the stator means.

10. The axial-gap motor/generator of claim 8 wherein each of the groups is comprised of three line voltage phases.

11. The axial-gap motor/generator of claim 8 wherein each of the groups is comprised of three phase coils that, within each of the groups, are coupled together.

12. The axial-gap motor/generator of claim 11 wherein each of the output lead means is output from a different phase coil.

13. The axial-gap motor/generator of claim 7 wherein the stator means is comprised of a toric shaped stator core.

14. The axial-gap motor/generator of claim 7 further comprising
a water channel located circumferentially around the stator means.

15. An axial-gap motor/generator comprising:
a stator equipped with a plurality of coils, the stator having a front axial side and a rear axial side with respect to a rotational axis of the stator;
a plurality of output lead wires led from the coils; and
a plurality of coil wire connection portions connecting the plurality of output lead wires, the coil wire connection portions being divided and arranged on both axial sides of the stator,
the coils comprising a first coil group and a second coil group, the first coil group having a first coil wire connection portion on the front axial side and being wound in a first direction, the second coil group having a second coil wire connection portion on the rear axial side and being wound in a second direction which is a reverse winding direction with respect to the first direction.

16. The axial-gap motor generator of claim 15 further comprising
a bus bar that is coupled to each output lead wire.

17. The axial-gap motor generator of claim 16 wherein the bus bar is arranged on an outer circumference of the stator.

18. The axial-gap motor generator of claim 15 wherein the coils are comprised of U-phase coils, V-phase coils, W-phase coils, X-phase coils, Y-phase coils, and Z-phase coils.

19. The axial-gap motor generator of claim 18 wherein the U, V, and W phase coils are in one group and the X, Y, and Z phase coils are in the remaining group.

20. The axial-gap motor generator of claim 15 wherein line voltages from each group are offset by 180 degrees from each other.

* * * * *